United States Patent [19]

Kimpel

[11] 4,120,173
[45] Oct. 17, 1978

[54] HEAD PRESSURE CONTROL SYSTEM FOR REFRIGERATION APPARATUS

[75] Inventor: Francis Alfred Kimpel, York, Pa.

[73] Assignee: Borg-Warner Corporation, Chicago, Ill.

[21] Appl. No.: 802,689

[22] Filed: Jun. 2, 1977

[51] Int. Cl.² .............................................. F25B 39/04
[52] U.S. Cl. ...................................... 62/181; 62/184; 62/196 B; 62/DIG. 17
[58] Field of Search ................. 62/181, 183, 184, 510, 62/DIG. 17, 175, 196 C, 196 B

[56] References Cited

U.S. PATENT DOCUMENTS

| | | | |
|---|---|---|---|
| 3,196,629 | 7/1965 | Wood | 62/183 |
| 3,481,152 | 12/1969 | Seeley | 62/196 B |
| 3,495,418 | 2/1970 | Kapich | 62/510 X |

*Primary Examiner*—William E. Wayner
*Attorney, Agent, or Firm*—James E. Tracy

[57] ABSTRACT

Constant condenser pressure is maintained in an air-cooled condenser of a refrigeration system which operates at either full capacity or reduced capacity depending on the heat load requirements. When operating at full capacity, the condenser head pressure will be held generally constant at a relatively high control point even in the presence of wide variations in condenser cooling air temperature. On the other hand, when the heat load requirements decrease and the refrigeration system switches to its reduced capacity operating mode, the control point automatically drops to a substantially lower level, whereupon the condenser pressure is maintained relatively fixed at that lower control point despite major changes in the condenser cooling air temperature. By automatically lowering the control point at reduced system capacity, maximum efficiency and economical operation are obtained.

11 Claims, 2 Drawing Figures

HEAD PRESSURE CONTROL SYSTEM FOR REFRIGERATION APPARATUS

BACKGROUND OF THE INVENTION

This invention relates to a control system for controlling the condenser pressure in a refrigeration system of the type having an air-cooled condenser. While the invention may be employed in a variety of such refrigeration systems, it is particularly useful in an all-weather air-conditioning system which operates at different system capacities and in the presence of a broad range of outside ambient temperatures. Accordingly, the invention will be described in that environment.

The condenser of an air-conditioning system is usually located out-of-doors or in heat exchange relation with outdoor air and is therefore subjected to widely varying ambient temperatures. If the system operates during cold weather, the outdoor temperatures may drop sufficiently low to materially reduce the condensing temperature of the refrigerant in the condenser. This produces a corresponding reduction in head pressure on the high pressure side of the refrigeration system, resulting in a decreased pressure differential across the expansion valve or other refrigerant metering device in the system. Because of the reduced pressure difference across the expansion valve, the flow rate decreases and less refrigerant flows from the condenser to the evaporator. As a consequence, the evaporator is starved and the heat load placed on the evaporator may not be satisfied.

If adequate head pressure is not maintained at low ambient temperatures, the evaporator temperature may drop below freezing, allowing condensed moisture to freeze on the evaporator. As the layer of ice builds up on the evaporator, the evaporator becomes insulated from the refrigeration load and a further reduction in effectiveness occurs.

Conversely, if the condenser head pressure is permitted to rise too high, higher than necessary operating costs are incurred, the expansion valve performs poorly, and in some cases nuisance trip-outs on high pressure occur.

Control systems have been developed for holding the condenser head pressure reasonably constant under varying ambient temperatures. In one such system, the condenser pressure is held at a fixed level, or control point, by keying the speed of a variable speed fan for the condenser to the condensing temperature, and thus to the condenser pressure. As the condenser pressure tends to deviate from the desired control point, the fan speed varies accordingly. For example, as it tends to decrease in response to a falling outside ambient temperature, the fan speed is automatically reduced. The volume of air blown across the condenser therefore decreases and this limits the amount of heat that can be extracted from the refrigerant as it flows through the condenser, insuring that the refrigerant pressure remains relatively close to the control point and does not fall below the minimum necessary for proper operation of the refrigeration system. By holding the pressure on the high side of the system at the control point, the pressure difference across the expansion or metering device will be sufficient to properly feed the evaporator and satisfy the head load.

In another well-known head pressure control system, useful when several fans are employed to cool the condenser, a fixed condenser pressure at a desired control point is obtained, in the presence of cooling air temperature changes, by cycling the fans on and off as necessary. The lower the ambient temperature, the smaller the number of fans needed.

Unfortunately, the prior control systems are capable of controlling at only a single condenser pressure and are therefore set at the head pressure required to maintain adequate refrigerant flow to the evaporator at full capacity. If the refrigeration system is of the type that has a reduced capacity operating mode, wherein the refrigerant flow rate is purposely reduced when the heat load drops, the previously developed control systems will maintain the condenser pressure at the same relatively high control point at both full and reduced capacity. During reduced capacity operation, the condenser pressure will therefore be substantially above that which is needed to adequately feed the evaporator. This higher than necessary head pressure results in unnecessary and wasteful power consumption. It also requires the expansion valve to throttle down further, causing unnecessarily high liquid refrigerant velocities. The high condenser pressure also results in greater changes in liquid flow for a change in valve position, making the expansion valve control loop more sensitive and unstable.

The present invention, on the other hand, changes the control point as the operating mode changes. During full capacity operation, the condenser pressure is maintained constant at a relatively high control point, and during reduced capacity operation the head pressure is held fixed at a much lower control point. This results in optimum operation at all outdoor air temperatures and at both full and reduced capacity, thereby maximizing the efficiency and minimizing the power requirements and operating costs.

SUMMARY OF THE INVENTION

The head pressure control system of the invention is incorporated in a refrigeration system having full capacity and reduced capacity operating modes, and which has an air-cooled condenser. There are control means, operable when the refrigeration system is established in its full capacity operating mode, for maintaining the condenser pressure in the refrigeration system relatively constant at a first control point despite wide variations in condenser cooling air temperature. Modifying means are provided for altering the operation of the control means, when the refrigeration system is established in its reduced capacity operating mode, to maintain the condenser pressure relatively constant at a second control point, substantially lower than the first control point, despite wide variations in condenser cooling air temperature.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

DESCRIPTION OF THE ILLUSTRATED EMBODIMENTS

Figure 1:
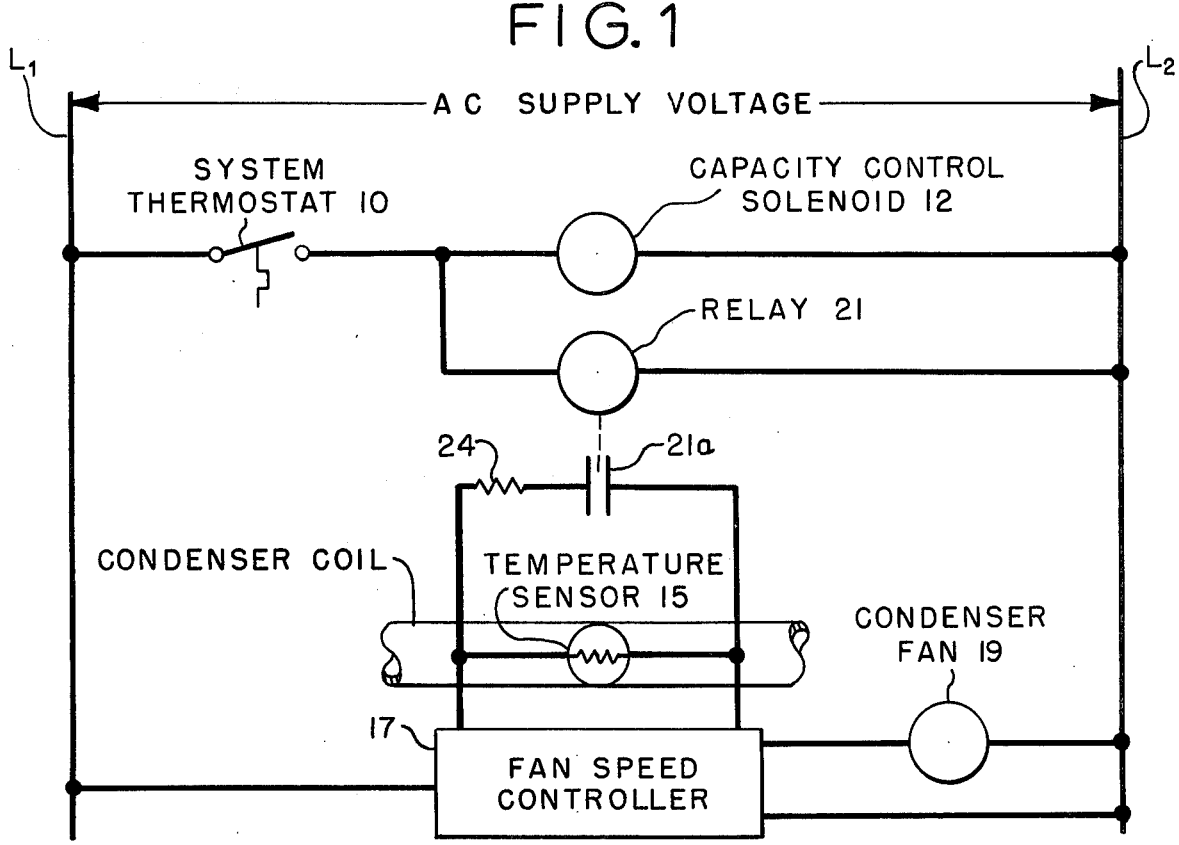
FIG. 1 schematically illustrates a head pressure control system, constructed in accordance with one embodiment of the invention, and the manner in which the control system is incorporated in a refrigeration system of the type having full and reduced capacity operating modes.

It will be assumed that the refrigeration equipment in the FIG. 1 embodiment is of the large capacity variety such as might be employed in air conditioning a large building. In such equipment, the evaporator may be in heat exchange relation with circulating water in a liquid chiller in order to chill the water which is then used to cool the building. Rather than turn the compressor on and off in response to the heat load requirements, it is preferred that the compressor be of the variable displacement or capacity type, operating at maximum displacement when more cooling is desired and at a lower displacement when less cooling is needed. For example, the compressor may have several cylinders all of which are effective or active when the refrigeration system must operate at full capacity. When reduced capacity is preferred, some of the cylinders may be made inactive. As a more specific example, the compressor may have eight operating cylinders at full capacity and four at reduced capacity.

System thermostat 10 senses the temperature of the circulating water as it enters or leaves the liquid chiller and serves as a control device for varying the operating mode of the refrigeration system in order to maintain the chilled water at the set point selected by the adjustment of thermostat 10. When maximum cooling is required, the water temperature will be relatively high and thermostat 10 will be open as shown in FIG. 1. At that time, all of the cylinders in the compressor will be active and the refrigeration system will function at full capacity, the refrigerant flow rate through the evaporator thereby being maximized.

As the cooling requirements are satisfied and the building cools down to the desired temperature, the temperature of the chilled water drops and system thermostat 10 closes. Capacity control solenoid 12 will now be energized by the AC power supply (for example 115 volts or 230 volts) to which line conductors $L_1$ and $L_2$ are connected. The compressor is unloaded in response to the energization of solenoid 12, namely some of its cylinders are rendered inactive, thereby reducing the capacity and decreasing the refrigerant flow rate in the refrigeration system. Less cooling of the water in the liquid chiller occurs, but thermostat 10 will remain closed as long as the chilled water temperature does not rise above the set point. If the heat load in the building then increases, the temperature of the chilled water will increase, whereupon thermostat 10 opens and switches the refrigeration system back to its full capacity operating mode.

Turning now to the invention, a control means is provided for maintaining the condenser pressure constant at one level during full capacity operation and at a much lower level during reduced capacity operation. More specifically, temperature sensing thermistor 15 is firmly secured to a portion of the condenser in heat exchange relation therewith in order to sense the liquid refrigerant temperature corresponding to saturated head pressure. The resistance of thermistor 15 thereby represents the sensed condensing temperature, and since the condensing temperature and head pressure are directly related and vary in step with each other, the resistance of thermistor 15 also represents the condenser head pressure. In this example, thermistor 15 has a negative temperature coefficient so that its resistance is an inverse function of the condensing temperature and the head pressure in the refrigeration system. Hence, if the temperature and pressure of the refrigerant in the condenser coil increase, the resistance of thermistor 15 decreases.

Head pressure sensor 15 may also be a pressure operated transducer which functions to vary the resistance (output) over a range of pressures which includes both the upper and lower set points.

Fan speed controller 17 operates in response to the resistance of sensor 15 and modulates the speed of a variable speed condenser fan 19 as necessary so that the amount of cooling air drawn across the condenser will be directly proportional to the pressure of the refrigerant in the condenser. In other words, the speed of condenser fan 19 is automatically decreased as the condensing temperature decreases and increased as the temperature increases. As a result, the condenser temperature and pressure are held relatively fixed.

Many fan speed controllers have been developed for performing the function of controller 17. In the preferred form of the controller, one version of which is disclosed and described in detail in copending U.S. patent application Ser. No. 637,927, filed Dec. 5, 1975, in the name of Frank E. Wills, and issued Feb. 28, 1978 as U.S. Pat. No. 4,075,865 and assigned to the present assignee, a solid state switch (for example, a triac) couples the condenser fan to the AC power supply and by controlling its conduction time or angle, during each half cycle of the alternating supply voltage, the solid state switch is alternately opened and closed to vary the RMS (root-mean-square) magnitude of the AC voltage applied to the condenser fan, thereby varying the fan speed. The time schedule of the closings (conduction intervals) and openings (non-conduction intervals) of the solid state switch is determined by the resistance of thermistor 15.

When the refrigeration system is in its full capacity operating mode (namely, thermostat 10 is open), fan speed controller 17 will be appropriately controlled by thermistor 15 to cause the condenser pressure to remain relatively fixed at a predetermined control point or pressure (for example, 250 psia) despite wide variations in condenser cooling air temperature. When the condenser pressure is at the desired control point, the temperature of the refrigerant sensed by thermistor 15 will be such that fan speed controller 17 applies a voltage to condenser fan 19 of a magnitude to drive the fan at the necessary speed to maintain the condenser pressure at the control point. If the outside ambient temperature then rises, tending to increase the condenser temperature and pressure, the resistance of thermistor 15 decreases and fan speed controller 17 increases the RMS voltage applied to fan 19, with the result that the speed of the fan increases and more air is drawn across the condenser. This in turn lowers the refrigerant pressure down to the required control point or 250 psia.

Conversely, if the temperature of the outside cooling air for the condenser decreases, causing the condenser pressure to drop, the resistance of temperature sensor 15 increases, whereupon controller 17 lowers the RMS magnitude of the AC voltage applied to fan 19, effecting a reduction in speed thereof. Less air is thus circulated over the condenser and the refrigerant temperature is allowed to rise, the condenser pressure thereby returning to the desired control point.

To achieve the ultimate in operating efficiency and energy conservation, when the refrigeration system switches to its reduced capacity operating mode, the operation of the head pressure control means is modified or altered in order to control the head pressure to a different and considerably lower control point, for example 140 psia. To explain, when thermostat 10 is closed and the refrigeration system is established in its reduced capacity mode, relay 21 is energized by the AC supply voltage and closes its normally-open contacts 21a, as a consequence of which fixed resistor 24 shunts thermistor 15. The parallel combination of thermistor 15 and resistor 24 has a resistance, when the condenser pressure is at the lower, or reduced capacity, control point (140 psia), which is substantially the same as the resistance of thermistor 15 by itself when the condenser pressure is at the higher control point, or 250 psia. Hence, the control imposed on controller 17 by the combination of sensor 15 and resistor 24 causes the controller to hold the condenser pressure at 140 psia regardless of ambient temperature changes.

In the lower capacity operating mode, less refrigerant liquid must flow into the evaporator and this means that a lower pressure differential is required across the expansion valve to push the refrigerant into the evaporator. When thermostat 10 closes, signalling that the refrigeration system is switching over to its lower capacity mode, the condenser pressure is allowed to drop to the 140 psia control point, whereupon fan speed controller 17, under the control of sensor 15 and resistor 24, will modulate the speed of fan 19 as required to hold the condenser pressure at 140 psia even though the condenser cooling air temperature varies over a broad range.

Hence, by automatically dropping the control point to a lower level at lower capacity, the operation of the refrigeration system is optimized and yet power consumption is significantly reduced.

Figure 2:
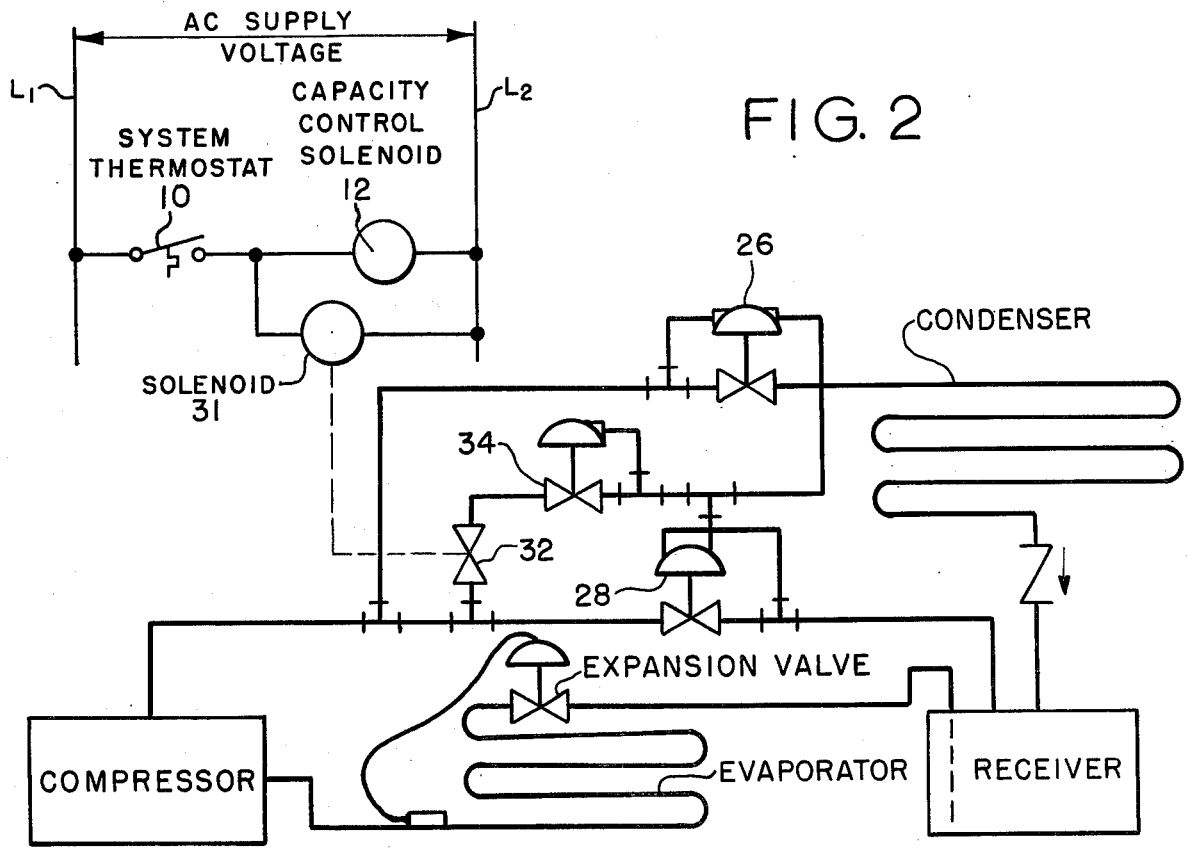
FIG. 2 shows a plural-capacity refrigeration system having a head pressure control system constructed in accordance with another embodiment of the invention.

The FIG. 2 embodiment illustrates that the head pressure may be controlled at different control points for different system capacities by means of floodback with control valves. During full capacity operation, control valve 26 maintains the compressor discharge at a sufficiently high level by closing off its feed to the condenser. At the full capacity level, control valve 28 opens as needed to maintain the receiver at full capacity pressure level, namely at the high control point. When system thermostat 10 closes to signal a capacity reduction, it also energizes solenoid 31 which opens solenoid-actuated valve 32. This permits a predetermined pressure, as regulated by pressure regulator valve 34, to be sent to the diaphragms or pistons in both control valves 26 and 28. These diaphragms or pistons are linked to the control diaphragms in such a manner as to add to the signal pressures sensed by these valves. Therefore, a lower sensed pressure is required to close valve 26 and to open valve 28, resulting in the reduction of the head pressure in the receiver to a much lower control point.

The invention provides, therefore, a unique control system for maintaining a relatively constant condenser pressure at one predetermined level at full capacity, but at a much lower predetermined level at reduced capacity, with the result that efficiency is improved, operating costs are reduced and power conservation is achieved.

While particular embodiments of the invention have been shown and described, modifications may be made, and it is intended in the appended claims to cover all such modifications as may fall within the true spirit and scope of the invention.

I claim:

1. In a refrigeration system having full capacity and reduced capacity operating modes, and which includes an air-cooled condenser, a head pressure control system comprising:

control means, operable when the refrigeration system is established in its full capacity operating mode, for maintaining the condenser pressure in said refrigeration system relatively constant at a first control point despite wide variations in condenser cooling air temperature;

and modifying means for altering the operation of said control means, when the refrigeration system is established in its reduced capacity operating mode, to maintain the condenser pressure relatively constant at a second control point, substantially lower than said first control point, despite wide variations in condenser cooling air temperature.

2. A head pressure control system according to claim 1 for use in a refrigeration system wherein a control device determines the operating mode, said modifying means being controlled by the control device.

3. A head pressure control system according to claim 1 for use in a refrigeration system wherein a system thermostat determines the operating mode, said modifying means being controlled by the system thermostat.

4. A head pressure control system according to claim 1 in which said control means senses and responds to the condenser pressure and automatically compensates for any pressure changes to maintain that pressure relatively constant.

5. A head pressure control system according to claim 1 in which said control means senses the condenser pressure and maintains that pressure relatively constant by modulating the speed of a variable speed fan for the air-cooled condenser, the speed varying directly with the sensed condenser pressure.

6. A head pressure control system according to claim 5 in which said control means includes a temperature sensing thermistor, attached to the condenser, for sensing the liquid refrigerant temperature corresponding to saturated head pressure and presenting a resistance which is a function of, and thereby represents, the condenser pressure; and a fan speed controller which operates in response to the resistance of said thermistor to drive the condenser fan at a speed directly proportional to the pressure of the refrigerant in the condenser.

7. A head pressure control system according to claim 6 in which said fan speed controller includes a solid state switch which couples the condenser fan to an AC power supply and is alternately opened and closed, in accordance with a time schedule determined by the resistance of said thermistor, in order to vary the magnitude of the voltage applied to the condenser fan, thereby varying the fan speed.

8. A head pressure control system according to claim 6 in which said modifying means alters the operation of said control means, when the refrigeration system is in its reduced capacity operating mode, by shunting said thermistor with a fixed resistor, the parallel combination of said thermistor and said resistor having a resistance, when the condenser pressure is at said second control point, which is substantially the same as the resistance of said thermistor alone when the condenser pressure is at said first control point.

9. A head pressure control system according to claim 1 for use in a refrigeration system wherein the refrigerant flows from a compressor and through the air-cooled condenser to a receiver, said control means including a first control valve between the compressor and condenser for closing off the refrigerant feed to the condenser, thereby to maintain the compressor discharge at a sufficiently high level, and a second control valve between the compressor and receiver for controlling the condenser pressure.

10. A head pressure control system according to claim 9 wherein said second control valve automatically opens as needed to maintain the receiver at said first control point when the refrigeration systems is in its full capacity operating mode, and in which said modifying means alters the operation of said first and second control valves, during reduced capacity operation, by closing said first control valve and opening said second control valve at a lower sensed pressure, thereby reducing the condenser pressure to said second control point.

11. A head pressure control system according to claim 10 wherein said modifying means includes a pressure regulator valve which is coupled to the compressor discharge during reduced capacity operation and supplies a regulated pressure to said first and second control valves to cause said control valves to actuate at a lower sensed pressure.

* * * * *